May 6, 1924.

G. BRAUN

MOTOR METER

Filed Aug. 23, 1922  2 Sheets-Sheet 1

1,493,318

George Braun
INVENTOR

BY Victor J. Evans
ATTORNEY

WITNESS:

May 6, 1924.
G. BRAUN
MOTOR METER
Filed Aug. 23, 1922
1,493,318
2 Sheets-Sheet 2
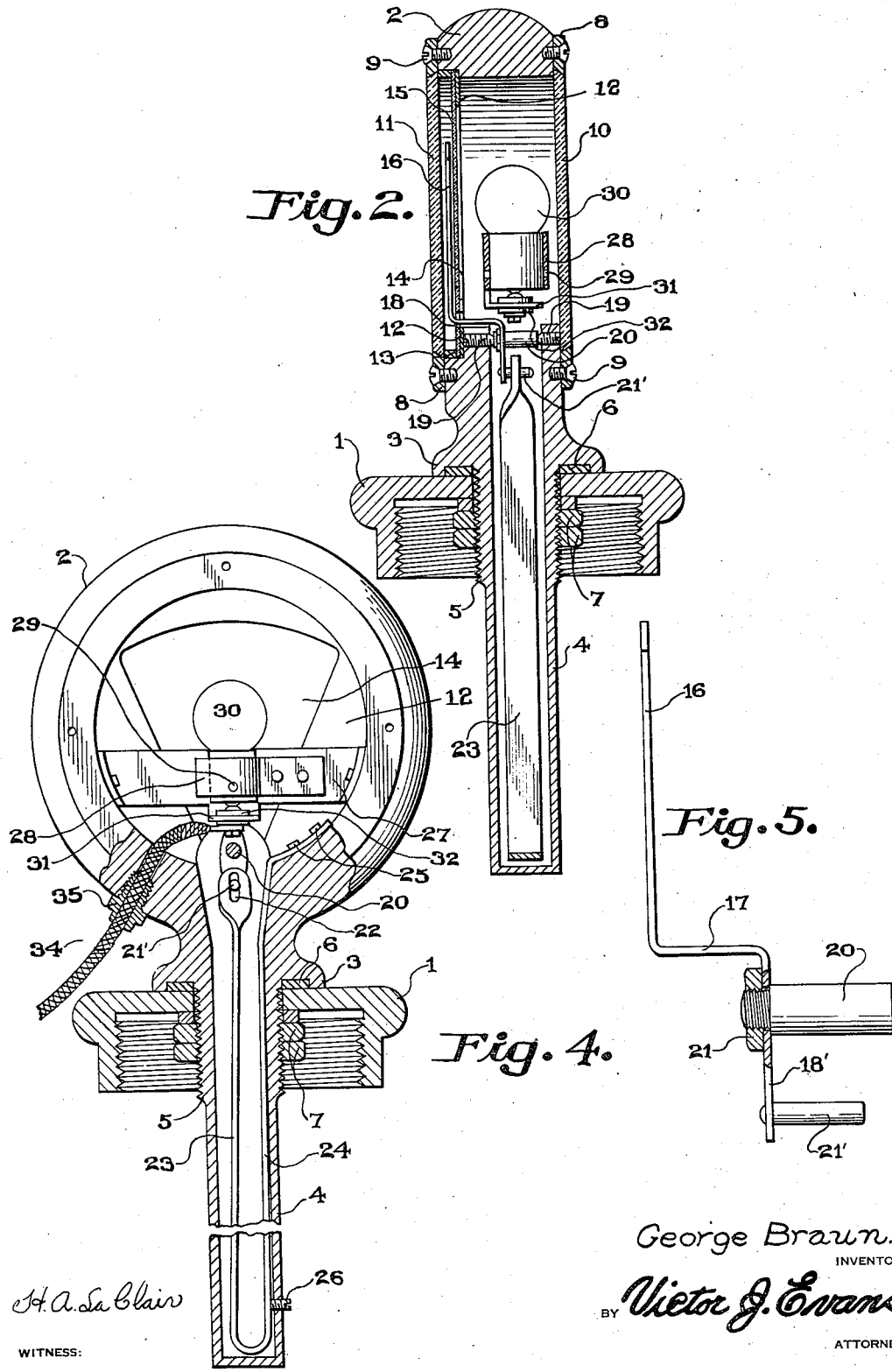
George Braun.
INVENTOR
BY Victor J. Evans
ATTORNEY
WITNESS:

Patented May 6, 1924.

1,493,318

UNITED STATES PATENT OFFICE.

GEORGE BRAUN, OF PROVIDENCE, RHODE ISLAND.

MOTOR METER.

Application filed August 23, 1922. Serial No. 583,865.

*To all whom it may concern:*

Be it known that I, GEORGE BRAUN, a citizen of Germany, residing at Providence, in the county of Providence and State of Rhode Island, have invented new and useful Improvements in Motor Meters, of which the following is a specification.

My present invention has reference to a motor meter.

In carrying out my invention, I propose to produce a motor meter in which a thermostatic spring influences an indicating finger to cause the same to travel over indicia on the face of the meter so that the driver of the automobile will be acquainted with engine conditions.

A further object is to provide a motor meter of this character with lighting means whereby the motor conditions can be observed in the night as well as in the day.

The foregoing, and other objects which will present themselves as the nature of the invention is better understood, may be accomplished by a construction, combination and operative association of parts, such as is disclosed by the drawings which accompany and form part of this application.

In the drawings:—

Figure 2 is a sectional view on the line 2—2 of Figure 1.

Figure 4 is an elevation with parts broken away and parts in section.

Figure 5 is a detail view of the dial hand and its intermediate associated members.

Figure 1:
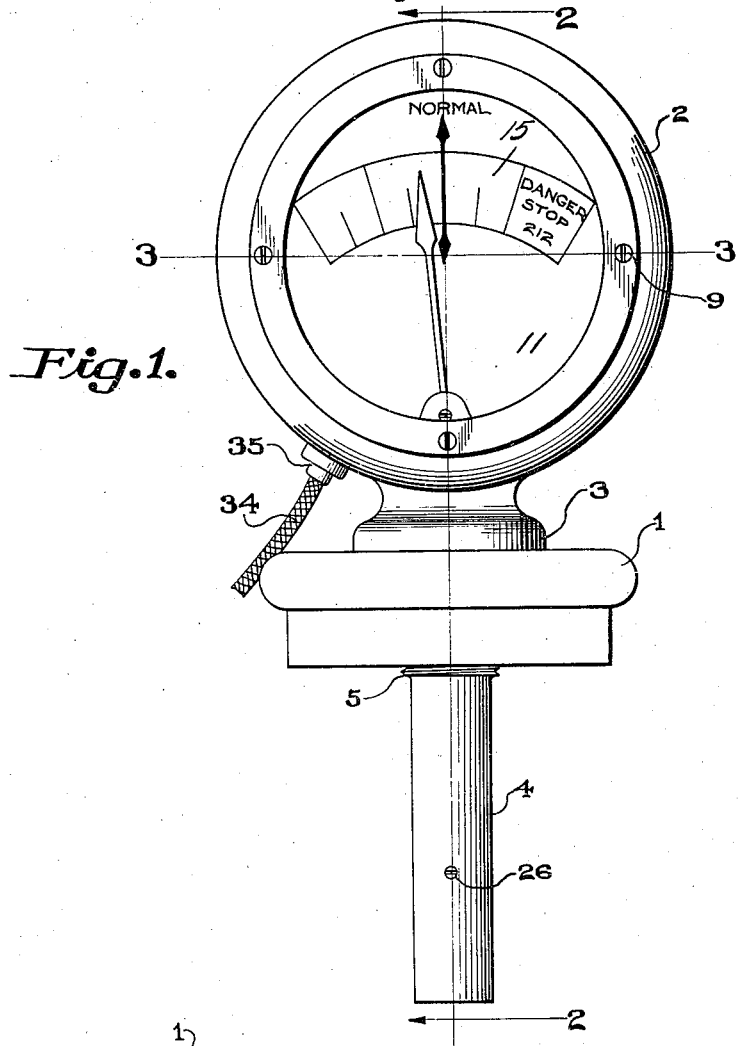
Figure 1 is an elevation of a motor meter in accordance with this invention.
Figure 3:
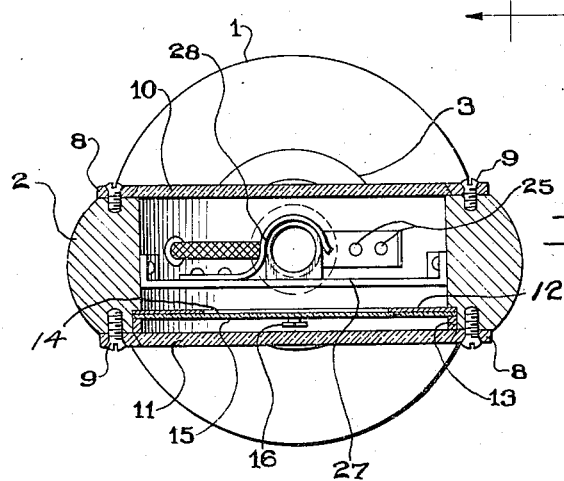
Figure 3 is a sectional view on the line 3—3 of Figure 1.

As disclosed by the drawings my motor meter is supported in the usual manner on the cap 1 for the filler spout of the radiator of a motor driven vehicle.

The frame of the improvement is in the nature of a ring member 2 having a base enlargement 3 provided with a tubular extension 4. The outer end of the tube is closed, and the upper portion thereof is thickened, and threaded, as at 5, so that the same can be screwed through the filler cap 1. The base of the enlargement 3 has an annular depression for the reception of a gasket 6, and the threaded portion 5 of the tube 4 has screwed thereon nuts 7 for effectively locking the device on the cap.

The ring frame arranged in contacting engagement on its opposed faces with annular members 8 respectively, the inner peripheral edge of which is beveled inwardly. The members 8 are secured on the frame by removable elements in the nature of screws 9. The annular members have their bevelled edges engaged by the beveled edges of glass disks 10 and 11 respectively.

The ring-like body 2 has its rear face at its inner periphery provided with an annular depression against the inner wall of which there is seated a dial plate 12, the said plate being held in position by a ring gasket 13 which contacts with the transparent disk 11 at the rear of the device.

The dial plate or disk 12, has a segmental opening 14 therethrough, and to one side of the opening there is secured a transparent plate 15 which engages the inner portion of the ring gasket 13 as shown and is provided with radially disposed indicating lines thereon which are perceptible through the opening 14. The transparent plate 15 has imprinted thereon warning data, such as "Normal," and may have the legends "Cool," and "Hot," as well as "Danger" and "Stop." However "Cool" and "Hot" are not shown in the drawings, but the dial is graduated as shown. The plate 15 is of transparent material.

The dial hand is indicated by the numeral 16 and is designed to be swung over the indicia on the plates 12 and 15 when the same is thermostatically influenced. The dial is retained in a vertical position and in a line with the arrow that is arranged centrally on the dial disk or plate 15. However, the dial is now in Figure 1 arranged to the left of the arrow. The hand 16 has its lower end provided with an offset portion 17 received through an elongated slot 18 in the plates 12 and 15. From thence the hand is provided with an angle extension 18' arranged parallel with the hand proper. Screwed in suitable openings on the opposed walls of the base 3, above the shoulder on which the gasket 13 rests are bolt members 19 respectively having conical or pointed confronting ends, and these ends are received in conical openings on the ends of a bearing member 20. The member receives the portion 18′ of the hand therethrough, and has screwed thereon a nut 21 to bind the said portion 18′ against the sleeve, so that the sleeve and hand will turn in unison.

On the end 18′ of the hand 16 there is a laterally extending pin 21′ which is received in an elongated slot 22 on the end of the thermostatic spring 23. The spring is given a half turn to provide the flattened slotted portion through which the pin 21′ passes. The spring is substantially U-shaped in plan, one arm of which is indicated for distinction by the numeral 24 resting against one of the walls of the tubular portion 4 of the improvement and having its end received in the ring body 2 of the improvement and bolted as at 25 to the wall thereof. The tubular member 4 has a threaded opening therethrough adjacent its closed end, and in this opening there is a headless bolt 26 designed for contact with the arm 24 of the thermostatic spring for adjusting this arm of the spring with respect to its second arm, and consequently regulating the influence of the spring by varying degrees of temperature.

In the body 2, below the opening in the dial plate 12 there is secured the angle ends of a transversely arranged bar 27. This bar has secured upon one of its faces the straight end of a substantially U-shaped spring clip 28, both the clip and bar having opposed apertures therethrough for the reception of the lugs on the base 29 of an electric bulb 30. The bar 27 is also provided with a depending substantially L-shaped bracket portion 31 supporting thereon the terminal or contact element 32 of an electric conductor 34. The conductor passes through an opening to one side of the base of the body 1, a hollow plug 35 being screwed in the said opening and providing a guide for the conductors. The conductors are encased in an insulating cover and are directed to the battery of the automobile. The current of electricity therethrough is controlled by a switch on the dashboard of the automobile (not shown). This switch may be and preferably is in the nature of a lighting switch for the head and tail lamps of the machine.

It is thought that the foregoing description, when taken in connection with the drawings will fully set forth the construction and operation of the improvement to those skilled in the art to which such inventions relate without further detailed description, it being apparent that the expansion and contraction of the thermostatic spring incident to the heated or cooled condition of the radiator will influence the hand 16 to swing the same over the indicia on the dial so that the condition of the radiator and consequent condition of the engine will be apparent to the driver of the machine. It will be also noted that by lighting the bulb such conditions may be observed in the night as well as in the day. The device is extremely simple, may be cheaply manufactured and marketed, but I may desire at a later date to make changes therefrom, and therefore it is to be understood that the invention is to be limited only to the scope of the appended claims.

Having described the invention, I claim:—

1. In a motor meter, a frame having a dial provided with graduations and other indicia, said frame having a tubular extension whose end is closed, a dial hand arranged over the dial pivotally supported in the frame and having a lateral pin below its pivot, and a two-arm thermostatic spring arranged in the tubular extension of the frame, one of the arms being secured to the frame and the other arm having an elongated slot receiving the pin of the dial hand therethrough.

2. A motor meter, including a ring frame having a base provided with a tubular extension whose lower end is closed and whose upper end is widened and threaded, transparent disks on the opposed faces of the ring frame, a dial arranged centrally in the frame and having graduations and indicia thereon and also having an opening therethrough, a dial hand pivotally supported in the frame, means for adjusting the pivots for the hand, a lateral pin on the lower end of the hand, a two-arm thermostatic spring in the tube, one of the arms being secured to the frame and the other arm having its end arranged transversely with respect to the plane thereof and provided with an elongated slot receiving the pin for operative association therewith.

3. In a motor meter, a ring frame having a base and a tube extending from the base whose lower end is closed and the bore of the tube communicating with the frame, transparent plates on the opposed faces of the frame, a dial disk between the plates and having an opening therethrough, a dial hand disposed over the dial, a bearing member on the hand, adjustable pivots, on the frame received in the ends of the bearing member, a laterally extending pin on the hand below the bearing member, a two-arm thermostatic spring in the tube having one of its ends secured to the frame, its other end provided with an elongated slot receiving therethrough the pin on the hand, and adjusting means between the tube and the thermostatic spring.

4. In a motor meter, a frame having a dial therein, said frame having a tubular extension whose outer end is closed, a dial hand arranged over the dial and being pivotally supported in the frame and having a lateral pin below its pivot, and a two-arm thermostatic spring arranged in the tubular extension of the frame, one arm being secured to the frame and the other arm having an elongated slot receiving the pin of the dial hand therethrough, and means for illuminating the dial.

In testimony whereof I affix my signature.

GEORGE BRAUN.